March 6, 1962

F. G. DANHIER 3,024,352

AUTOMATIC UPWARD WELDING PROCESS

Filed March 31, 1960

INVENTOR
Francois Georges Danhier
BY
ATTORNEYS

1

3,024,352
AUTOMATIC UPWARD WELDING PROCESS
Francois Georges Danhier, Anderlecht, Brussels, Belgium, assignor to La Soudure Electrique Autogene, S.A., Brussels, Belgium, a corporation of Belgium
Filed Mar. 31, 1960, Ser. No. 18,940
2 Claims. (Cl. 219—126)

The present invention relates to an automatic electric welding process in which joints are filled from the bottom up with weld metal deposited from at least one continuous electrode immersed in a layer of slag maintained in liquid condition by the heat generated by electric current traversing the layer, with the slag and molten weld metal being contained by the parts to be welded and by cooled metallic shoes. In this process, fluxing ingredients, slag-forming materials and other substances useful to improve the quality of the weld metal are continuously fed between the shoes to compensate for the consumption of molten slag resulting from the escape of a layer of slag between the weld metal and the shoes.

In this specification, the various materials brought into the liquid slag are called flux. The slag is formed from flux and from products of reactions between said flux and the oxidizable elements of the base metal and of the electrode.

In known processes of this kind, which have been proposed especially to weld thick vertical plates, the electrode is a solid bare wire immersed in the liquid slag and the flux is added sporadically to the slag to compensate for its consumption.

The reactions between slag and metal occur mainly in the super heated zone between the tip of the electrode and the liquid metal pool. These reactions are very incomplete because of slag turbulence. From the surface of the slag layer, where it is poured, fresh flux mixes more or less regularly with the slag. A variable portion of the new flux reaches the tip of the electrode. Another portion, mixed with used slag, is eliminated between the shoes and solidified weld metal.

One of the drawbacks of this flux feeding method is that the flux is irregularly carried down to the tip of the electrode, while an undetermined portion of said flux escapes the reaction zone.

In welds of great thickness, the surface of the slag pool is very much elongated; a large portion of the new flux, poured at the ends of the pool, escapes the reaction zones because it leaves the surface of the slag pool to reach the gap between the weld and shoes through a very short path. The center portion of the slag pool whirls endlessly between the reaction zones (wire tips) and reacts longer and longer with liquid metal.

The composition of this slag of the center portion is thus changing with time. The primitive reactions between slag and metal are replaced by other reactions resulting from surface oxidation of used slag moving in closed circuit, and from subsequent combination with metallic elements. Therefore, the chemical and metallurgical composition of the weld varies as welding proceeds.

Welds obtained by this process are consequently heterogeneous and inferior as far as mechanical properties are concerned.

If deoxidizers were contained in new flux, their action would be energetic at the time of introduction of a new batch of flux and would then slow down considerably until a second batch is fed in, bringing about a renewed reaction activity. Should the flux contain calcium fluoride for use as remover of sulphur and phosphorus, this fluoride would risk being decomposed irregularly before coming into contact with the metal pool.

Another drawback is insufficient regularity in feeding the flux into the slag pool and inaccurate proportioning of the slag with respect to the deposited metal, which may also cause variations in the properties of the latter.

Irregularity in flux feeding occurs not only in time, but also along the thickness of the joint, due to the necessity of pouring the flux at one end of the pool.

The present invention covers an automatic upward welding process of the kind described, which is free from these drawbacks.

According to the invention, the flux is brought into contact with the molten slag, in the portion of the latter close to liquid weld metal, by means of at least one composite electrode comprising, in a manner known per se, a bare metallic shell, with a flux filling.

In the process of the invention, the flux is brought in a solid condition to a point a few millimeters from the liquid metal and develops its useful action upon the metal at the time it melts, before being diluted in the already molten slag which surrounds it and covers it. The slag is now used only to insulate the molten metal thermally and chemically from the atmosphere, and to preheat the edges of the parts being welded in the vicinity of the welding zone.

The process of the invention also provides automatically regular feeding of the slag pool as well as accurate proportioning of the amount of flux with respect to the deposited metal.

As indicated above, composite electrodes of the kind used in the process as per the invention are known per se, but so far they have always been intended to deposit horizontal welding beads by the visible arc welding process where an arc is maintained between the tip of the electrode and the deposited metal. The flux was therefore carried through the arc in a molten condition requiring simultaneous use of a protective gas around the arc if its useful properties were to be preserved until its contact with the liquid metal. In the process of the invention, where no electric arc exists, it is no longer necessary to use a protective gas to keep the flux fully active before it mixes with the already liquid slag.

Furthermore, when welding joints from the bottom up, between very thick plates, with several electrodes, it happens that, despite a lateral motion of these electrodes parallel to the abutting faces of the joint, one may want to deposit close to the cooled metallic shoes a metal of different composition than the weld in the middle of the thickness of the parts. This may be obtained easily by using near the external faces of the welded joint composite electrodes having a different flux from the one of at least one intermediate electrode. If the flux were poured over the liquid slag, such effect would be so difficult to achieve that such method would have to be considered as practically unusable.

More generally, according to one form of the process of the invention, several composite electrodes are used with fluxes varying from one electrode to the next, in relation with the properties desired for deposited metal originating from these electrodes in the vicinity of the locations where they melt in the slag.

The drawings enclosed with this specification illustrate the process of the invention in its application to the welding of thick vertical joints.

Figure 1:
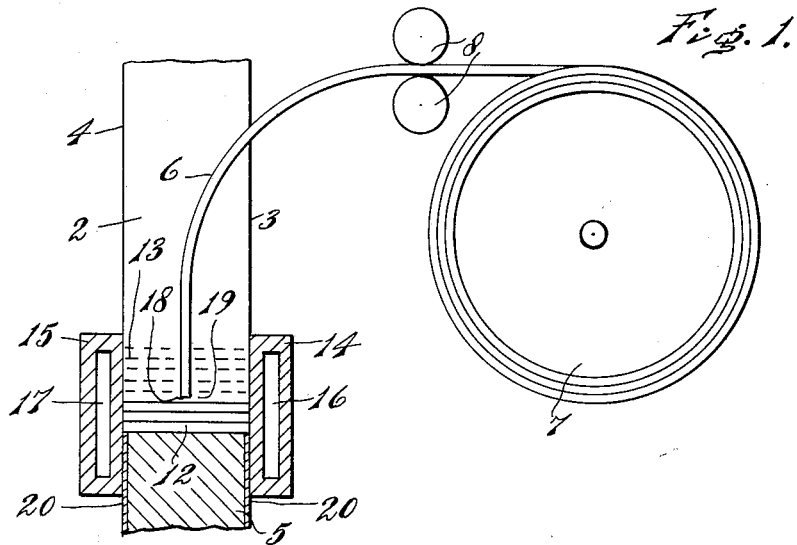
FIGURE 1 is a vertical cross-section perpendicular to the large faces of two thick vertical plates, at the joint between these plates obtained by the process of the invention.

In FIGURE 1, a portion of a thick vertical plate 2 is shown by the traces 3 and 4 of its two large vertical faces, which are perpendicular to the paper. This plate must be welded to another vertical plate located in front of the first one and in front of the paper, with its two large faces in the same planes as faces 3 and 4.

Figure 3:
FIGURE 3 is a vertical cross-section through a composite electrode of a type suitable to utilize the process of the invention.

These plates are already partially welded together by the vertical weld 5. The welding operation proceeds from bottom to top by melting a continuous welding electrode 6 unwound from a coil 7 and fed in proportion to its fusion by a pair of feed rolls 8 which also supply the welding current to the electrode. The latter is a composite electrode, for example of the type shown in FIGURE 3. It comprises an outer metallic shell 9 having inward projections 10 entrapping flux 11, with the shell 9, the projections 10 and the flux 11 melting simultaneously. The liquid weld metal 12 is shown by full horizontal lines while the liquid slag 13 surmounting it is shown by dotted horizontal lines. Both liquid pools 12 and 13 are contained between the plates being welded, by hollow metallic shoes 14 and 15 pressing against the large faces 3 and 4. These shoes are cooled by water circulating in cavities 16 and 17.

Feeding of electrode 6 is conducted at such speed that the lower tip 18 of the wire will melt in the lower portion 19 of liquid slag 13, i.e. in the portion closest to liquid weld metal 12. The ingredients of flux 11 which are useful to the composition of the weld pool 12 can therefore act upon it before reacting with the portion of liquid slag 13 which is above the tip 18. When the welding operation is under way, both slag and weld metal are kept in fusion by the heat resulting from a very intense current passing through the slag with no arc present.

The slag which results from the fusion of the slag-forming ingredients of the flux and from products of possible reactions between the flux, oxidizable components of the base metal and the electrode, escapes from the pool in two thin layers of cooled slag 20 between the shoes 14 and 15 and the solidified weld joint 5.

Figure 2:
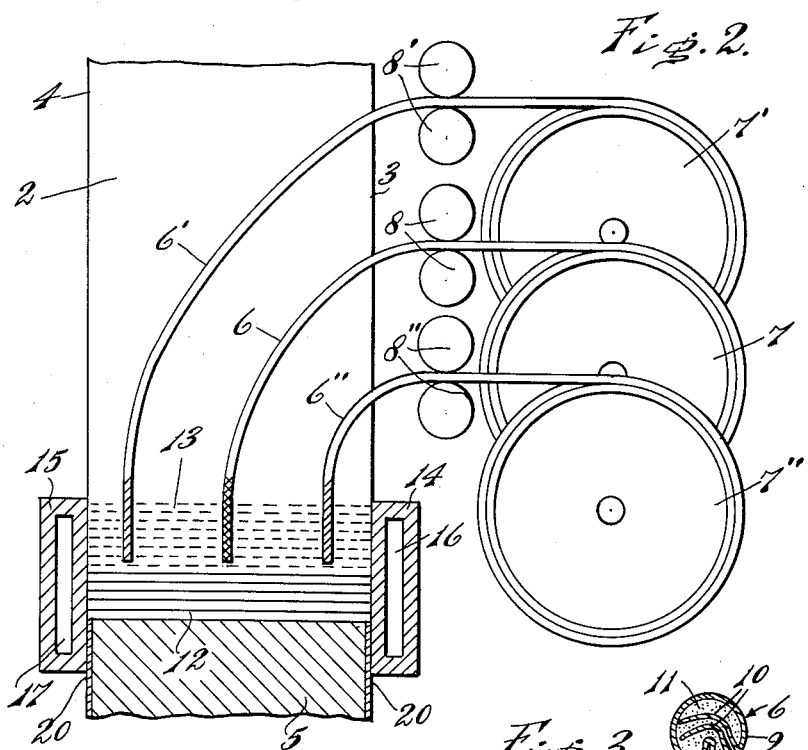
FIGURE 2 is a cross-section of the same nature in a vertical joint between plates noticeably thicker than in FIGURE 1.

In FIGURE 2, welding of plates much thicker than in FIGURE 1 is obtained by melting simultaneously three composite electrodes 6, 6′ and 6″ which are unwound from coils 7, 7′ and 7″, being fed to the pool and supplied with current by feed rolls 8, 8′ and 8″. Electrodes 6′ and 6″ which deposit metal near the external faces 3 and 4 have identical composition, but the electrode 6 depositing weld metal in the middle of the thickness of the joint has a different composition. These different compositions have been shown by single hatching on part of the length of electrodes 6′ and 6″ and by double hatching on part of the length of electrode 6. Actually, each one of these electrodes has the same composition on its entire length and the differences of composition from one to the other are generally obtained from the use of different fluxes which are of course not visible from the outside as the diagrammatic illustration might lead one to believe.

Hereafter are three examples of fluxes which might be placed inside a continuous metallic shell of low carbon steel, optionally provided with internal projections, to perform as composite electrodes suitable for use with the process of the invention.

*Example 1*

In the case when upward welding by the process of the invention must be performed on low carbon steel parts, the following flux can be used, expressed in percentages by weight:

| | Percent |
|---|---|
| Manganese silicate | 20 |
| Ferromanganese (80% Mn, 1% C) | 28 |
| Ferrosilicon (75% Si) | 15 |
| Silico-manganese | 6 |
| Iron powder | 31 |

*Example 2*

To weld molybdenum type steel parts under similar conditions, the following flux can be used, expressed in percentages by weight:

| | Percent |
|---|---|
| Slag-forming ingredients | 20 |
| Ferromanganese (80% Mn, 1% C) | 28 |
| Ferrosilicon and silicomanganese | 15 |
| Iron powder | 30 |
| Ferromolybdenum (60% Mo) | 7 |

*Example 3*

In the case of nickel-bearing steel parts, the following flux can be used, expressed in percentages by weight.

| | Percent |
|---|---|
| Slag forming ingredients | 20 |
| Ferromanganese (80% Mn, 1% C) | 28 |
| Ferrosilicon (70% Si) | 15 |
| Nickel powder | 25 |
| Iron powder | 10 |
| Ferrotitanium (40% Ti, 5% Al) | 2 |

E.g., in above cases, to weld plates of about three inches thickness, flux filling of the composite electrode will weigh approximately 8% of the weight of the metallic shell.

In view of my invention and disclosure variations and modfications to meet individual whim or particular need will doubtless become evident to others skilled in the art, to obtain all or part of the benefits of my invention without copying the process shown, and I therefore, claim all such insofar as they fall within the reasonable spirit and scope of my claims.

It must be understood that slag forming ingredients include any and all of the following: silica, manganese oxide, aluminium oxide, magnesium oxide, calcium oxide, baryum oxide, rutile, aluminates, titanates, glass and other silicates, that fluxing ingredients include any and all of the following: potassium oxide, natrium oxide, fluorspar, cryolithe, ferrous oxide, ilmenite, and that other components useful to improve the quality of the weld metal can include any and all of the following: ferrotitanium, ferromanganese, silicomanganese, iron powder, aluminium, aluminium-magnesium, ferromolybdenum, nickel, ferrosilicium, ferrovanadium, ferrochromium.

Having thus described my invention what I claim as new and desire to secure by Letters Patent is:

1. A process of automatic electric upward welding of joints to fill from the bottom up with weld metal deposited from a plurality of flux-cored bare electrodes under a layer of slag made liquid by the heat resulting from the passage of current through it, said weld metal being contained between vertical parts to be welded, together with the molten slag, by cooled metallic shoes with continuous feeding between the shoes of fluxing ingredients, slag-forming materials and other components useful to improve the quality of the metal, in order to compensate for the consumption of liquid slag resulting from the escape of a layer of solidified slag between the deposited metal and the shoes, which process comprises feeding a plurality of flux-cored electrodes having different flux compositions toward the upper surface of different parts of the weld and thereby depositing weld metal of different compositions in different zones from one side to the other of the vertical welded joint in the direction of thickness.

2. The process of claim 1, which comprises feeding near the external faces of the welded joint bare composite electrodes containing fluxes different from the flux in at least one other electrode placed between them.

References Cited in the file of this patent

UNITED STATES PATENTS

| | | |
|---|---|---|
| 2,395,723 | Chmielewski | Feb. 26, 1946 |
| 2,654,015 | Landis et al. | Sept. 29, 1953 |
| 2,909,642 | Landis | Oct. 20, 1959 |

FOREIGN PATENTS

| | | |
|---|---|---|
| 203,327 | Austria | Mar. 11, 1959 |